US006206028B1

United States Patent
Holden et al.

(10) Patent No.: US 6,206,028 B1
(45) Date of Patent: Mar. 27, 2001

(54) UNIVERSAL MULTI-PATH CONTROL VALVE SYSTEM

(75) Inventors: R. Stuart Holden, Farmington; Richard E. Marzec, Higganum, both of CT (US); Frank Pieters, Pointe-Claire (CA)

(73) Assignee: The Keeney Manufacturing Company, Newington, CT (US)

( * ) Notice: Subject to any disclaimer, the term of this patent is extended or adjusted under 35 U.S.C. 154(b) by 0 days.

(21) Appl. No.: 09/596,832

(22) Filed: Jun. 19, 2000

(51) Int. Cl.[7] .............................. F16K 5/20; F16K 51/00
(52) U.S. Cl. ..................... 137/271; 137/595; 137/625.19
(58) Field of Search ...................................... 137/595, 271, 137/269, 625.19

(56) References Cited

U.S. PATENT DOCUMENTS

| | | | | |
|---|---|---|---|---|
| 3,234,958 | * | 2/1966 | Butters | 137/595 X |
| 3,865,139 | * | 2/1975 | Tolnai | 137/625.19 |
| 4,611,626 | * | 9/1986 | Logsdon | 137/595 X |
| 4,880,032 | * | 11/1989 | Doutt | 137/625.19 |
| 5,129,420 | * | 7/1992 | Johnson | 137/595 |
| 5,437,304 | * | 8/1995 | Delcroix | 137/595 |

* cited by examiner

Primary Examiner—Kevin Lee
(74) Attorney, Agent, or Firm—Alix, Yale & Ristas, LLP

(57) ABSTRACT

A universal multi-path control valve system includes at least two sets of outlets controlled by a single on/off operator. A compact design allows the control valve system to save space in the compact areas where plumbing fixtures are typically installed. The control valve system is constructed entirely of molded plastic components. Fittings supplied with the control valve system allow for customized installation according to the needs of the installer. Appliances may be easily added or removed using threaded connections on the valve and fittings supplied as part of the control valve system.

16 Claims, 2 Drawing Sheets

UNIVERSAL MULTI-PATH CONTROL VALVE SYSTEM

FIELD OF THE INVENTION

This invention relates to fluid handling, and more particularly to a supply/shutoff valve system having multiple inlets and multiple outlets for each inlet.

BACKGROUND OF THE INVENTION

Modern kitchens and bathrooms frequently include a variety of water consuming apparatuses which require a supply of hot and/or cold water. These apparatuses include garbage disposals, refrigerators (with water dispensers and/or icemakers), dishwashers, water filtration systems, faucets, instant hot water makers and the like. Conventionally, each such appliance and faucet required an associated supply/shut off valve. Installation of such valves is often beyond the capability of the homeowner. Also, the spaces where such valves are typically installed, e.g. under kitchen sinks and in bathroom vanities, are frequently very limited. Installation of multiple valves and their associated plumbing in these spaces is frequently difficult, time consuming and expensive. The resultant jumble of valves may result in the consumer not knowing which valve to operate to shut off a particular appliance.

Consumers are increasingly concerned with the presence of contaminants in their water supply. It is well known that traditional soldered plumbing can transmit lead into a household water supply. Alternative materials, such as advanced molded plastic materials, are frequently used in applications where traditional plumbing is undesirable due to its possibly toxic effect on the water supply. Molded plastic fixtures often have the added benefit of being easier to install than their traditional metal counterparts.

SUMMARY OF THE INVENTION

Briefly stated, the invention, in one preferred embodiment, is a valve system including a novel multiple outlet valve assembly. This valve assembly comprises a molded plastic housing which defines an elongated valve shaft chamber and at least two groups of fluid inlet/outlet passages. These groups of passages each include at least three connectors which, when the valve assembly is in the open state, are in fluid communication with one another. The valve assembly also includes a rotatable valve shaft, valve seats and a handle. The valve assembly is preferably sold with a plurality of plugs and fittings which together form a system. The system allows the consumer to select the ultimate valve system configuration from a variety of possible combinations.

A pair of ball valves, interconnected by the rotatable valve shaft, are installed in the valve shaft chamber of the housing. The ball valves are provided with a fluid flow passage and are selectively positionable to establish or interrupt fluid communication between a first connector and a pair of further connectors of the same group. Seals are provided to isolate the groups of connectors from one another and also to separate the fluid transmitting portions of the valve assembly housing from the ambient atmosphere. The connectors are internally and/or externally threaded, facilitating the attachment of the plugs and fittings and/or fluid supply and distribution conduits. Removable valve seats are positioned to cooperate with each of the valve balls.

An object of the present invention is to provide a new and improved valve system which can be employed to supply both hot and cold water to one or more diverse fluid consuming loads.

Another object of the present invention is to provide a new and improved multiple outlet valve system of efficient molded construction which does not contribute lead to the water supply.

A yet further object of the present invention is to provide a new and improved multiple outlet valve system which provides for a simplified and space saving installation.

A yet further object of the present invention is to provide a new and improved multiple outlet valve system which employs a single operator handle.

Other objects and advantages of the invention will become apparent from the drawings and the specification.

DETAILED DESCRIPTION OF THE DISCLOSED EMBODIMENT

Figure 1:
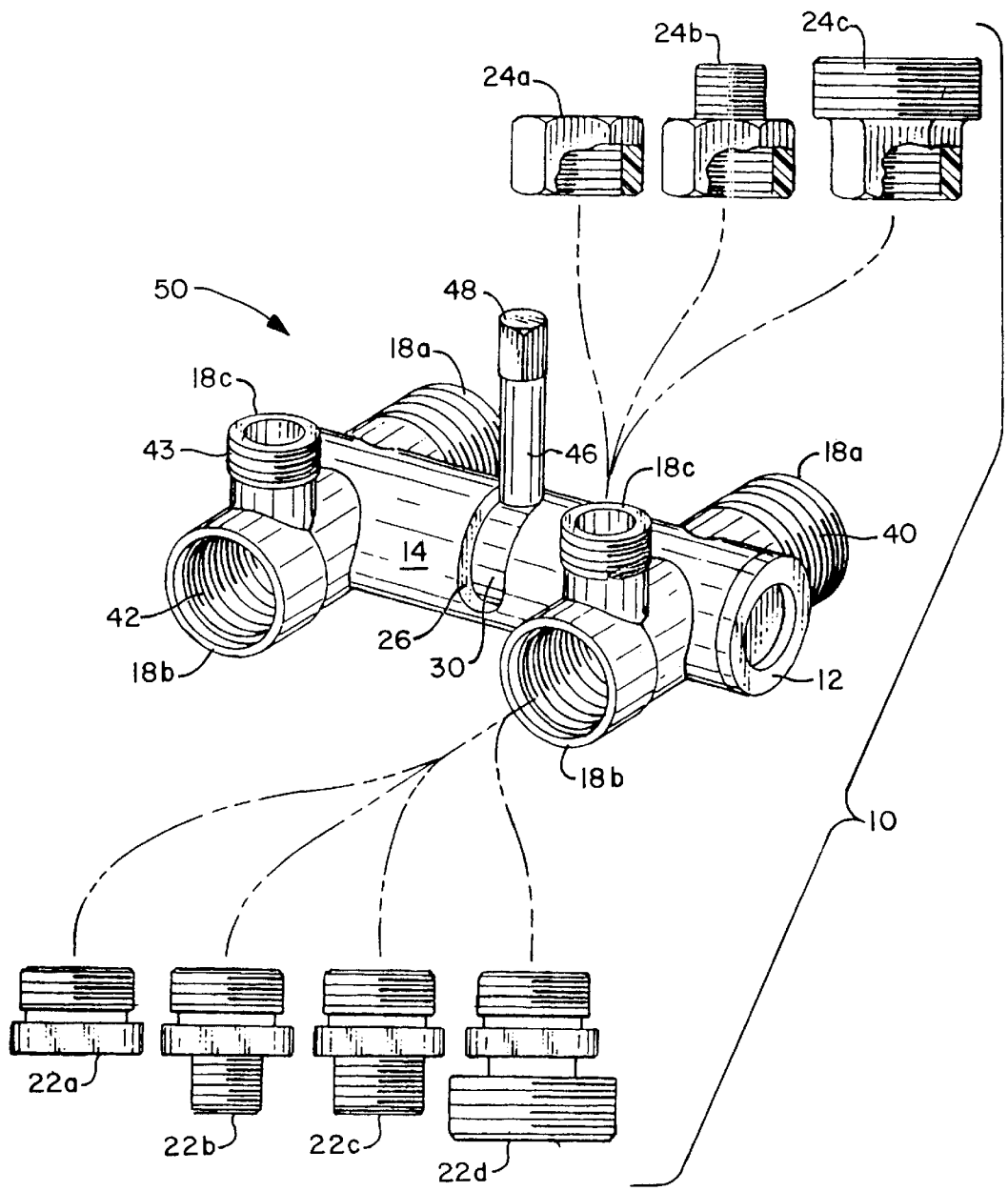
FIG. 1 is an exploded elevational perspective view of a universal multi-path control valve system in accordance with the present invention.
Figure 3:
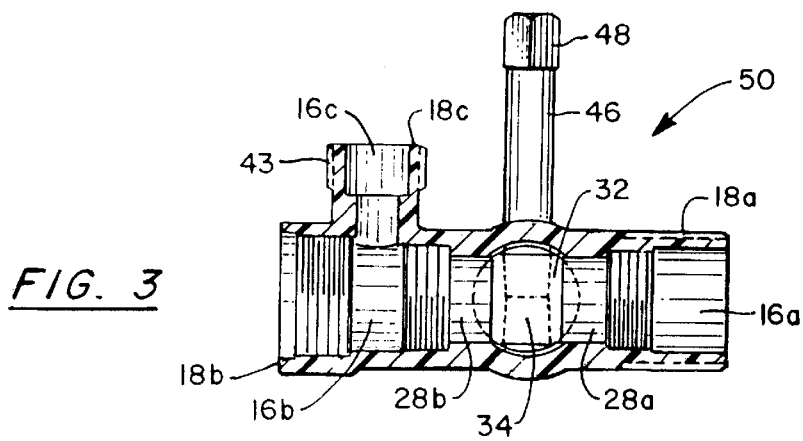
FIG. 3 is a sectional view of the multiple outlet valve assembly of FIG. 2 taken along line 3—3 thereof.
Figure 4:
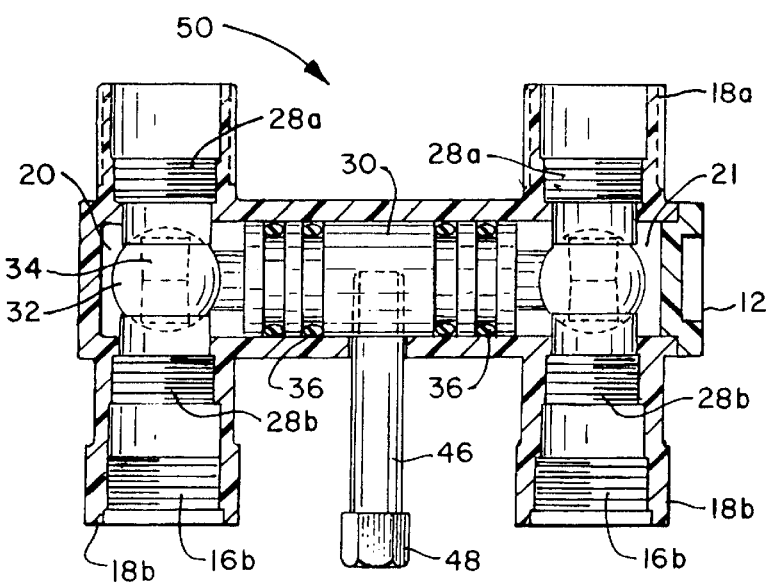
FIG. 4 is a sectional view of the multiple outlet valve assembly of FIG. 2 taken along line 4—4 thereof.

With reference to the drawings, wherein like numerals represent like parts throughout the figures, an embodiment of a universal multi-path control valve system in accordance with the present invention is generally designated by numeral 10. With reference to FIG. 1, one possible embodiment of valve system 10 includes a multiple outlet valve assembly 50 and a set of fittings 22a–22d, 24a–24c. Valve assembly 50 includes a housing 14 having pairs of outlet connectors 18b, 18c. The fittings 22a–22d, 24a–24c are adapted to alter the configuration of each outlet connector 18b, 18c. With reference to FIGS. 3 and 4, the multiple outlet valve assembly 50 valve housing 14 defines an internal elongated valve shaft chamber 20 for receiving a rotatable valve shaft 30. One end of the valve shaft chamber 20 is provided with an opening 21 for installation of the valve shaft 30, valve members 32 and seals 36.

The housing 14 also defines, in the disclosed embodiment, two groups of fluid flow passages 16a–16c in fluid communication with the valve shaft chamber 20. Each group of fluid flow passages 16a–16c includes an inlet passage 16a and at least two outlet passages 16b, 16c. One of the outlet passages 16b is coaxial with the inlet passage 16a. The other outlet passage 16c is in fluid communication with outlet passage 16b, i.e., passages 16c branch off passages 16b. The inlet passage 16a and the outlet passages 16b, 16c are located on opposed sides of the valve shaft chamber 20.

Each fluid flow passage terminates in a connector 18a–18c on the exterior of the housing 14. The connector 18a at the termination of each inlet passage 16a is provided with external threads 40 configured to allow the connection thereto of fluid supply lines (not illustrated). As shown in FIG. 1, the outlet connector 18b on each outlet passage 16b is provided with internal threads 42 for the connection of fittings 22a–22d or fluid delivery lines to appliances (not illustrated). The outlet connector 18c on each outlet passage 16c is provided with external threads 43 configured for the connection of fluid delivery lines to a faucet (not illustrated).

Fittings 24a–24c are provided for altering the configuration of outlet connector 18c.

Spherical valve members 32 are integral with movable valve shaft 30. O-ring seals 36 are positioned in grooves on the valve shaft to cooperate with the valve shaft and interior surface of the valve shaft chamber 20. The seals 36 separate the groups of fluid passages 16a–16c from each other and from the ambient atmosphere. The valve shaft 30 with its associated valve members 32 and seals 36 are inserted into the valve shaft chamber 20 through opening 21. The compressed relationship of the O-ring seals 36 between the valve shaft 30 and the interior surface of the valve shaft chamber 20 aids in aligning the valve shaft within the chamber. A cap 12, which is adhesively bonded to housing 14 after the shaft 30 and valve members 32 have been installed, seals the access opening 21 at the end of valve shaft chamber 20.

The valve members 32 are ball-shaped and have a bore 34 which can be positioned to allow fluid to flow between the inlet passages 16a and the outlet passages 16b and 16c. An operator 46 extends through an arcuate slot 26 in the valve housing 14 to threadably engage a central portion of the valve shaft 30. The length of the arcuate slot 26 allows the operator 46 to rotate the valve shaft 30 and its integral valve members 32 through 90° within the valve shaft chamber 20. A hex head 48 is provided to aid in installation and/or removal of the operator 46.

FIG. 4 is a cross sectional view of the multiple outlet valve assembly 50 with the valve shaft 30 and valve members 32 in the open position, i.e., the bore 34 of each valve member 32 is in registration and alignment with the inlet passage 16a and the outlet passage 16 b, allowing fluid flow through the control valve system. FIG. 3 is a cross sectional end view of the multiple outlet valve assembly 50 with the valve shaft 30 and valve members 32 in the closed position, i.e., the bore 34 of each valve member 32 is perpendicular to the inlet passage 16a and outlet passage 16 b, preventing fluid flow through the control valve system.

Figure 2:
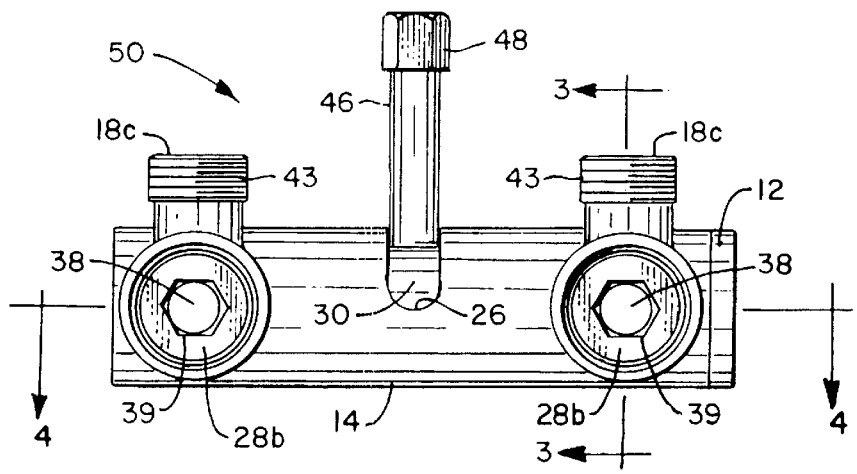
FIG. 2 is a front view of a multiple outlet valve assembly in accordance with the present invention.

Valve seats 28a, 28b are threaded into each inlet passage 16a and each outlet passage 16b, respectively, to engage opposed surfaces of the valve member 32 associated with that particular group of fluid flow passages 16a–16c. The threaded engagement allows each valve seat 28a, 28b to be adjustably positioned with respect to the valve member 32. As is best seen in FIG. 2, each valve seat 28a, 28b defines a fluid flow path 38 and, coaxial therewith, a socket 39 which faces outwardly. The illustrated embodiment employs a hex socket, for engagement by an Allen type wrench, although other configurations are possible.

An inward facing concave surface of each valve seat 28a, 28b engages the convex outer surface of either side of the valve member 32, to allow or prevent fluid flow, depending on the position of the valve member 32. Thus, each valve member 32 is compressively engaged between opposed pairs of valve seats.

The disclosed embodiment is assembled from discrete molded plastic components. A preferred material for molding the valve seats 28a, 28b is lubricated acetal. The valve housing 14 comprising the valve shaft chamber 20, fluid flow passages 16a–16c and their associated connectors 18a–18c is preferably molded from acetal. The valve shaft 30, valve members 32 and operator are also preferably molded from acetal. The components of the control valve system 10 are separately molded prior to assembly. The molded construction of the components lends itself to very efficient production of components having acceptable dimensional tolerances. The plastic materials do not contribute metallic contaminants to the household water supply.

The control valve system 10 includes fittings configured to engage each of the thread configurations present on the outlet connectors 18b, 18c. Outlet connector 18b is provided with an internal 11/16-16 2B thread 42. Fittings 22a–22d are provided with a complementary external 11/16-16 2A thread. Fitting 22a is essentially a plug configured to close off an unused outlet connector 18b. Fittings 22b–22d are configured to change the internal thread configuration of outlet 18b to three different external thread configurations: 7/16-24 UNS-2A (22b ice maker adapter), 9/16-24 UNEF-2A (22c secondary outlet adapter), and 3/4-11.5 NHR (22d washing machine adaptor).

Outlet connector 18c is provided with an external 9/16-24 UNEF-2A (standard faucet supply line connection) thread 43. Fittings 24a–24c are provided with a complementary internal 9/16-24 UNEF-2B thread. Fitting 24a is a cap configured to close off an unused outlet connector 18c. Fittings 24b and 24c are adapters configured to change the external thread configuration of outlet 18c to two different thread configurations: 7/16-24 UNS-2A (24b ice maker adapter) and 3/4-11.5 NHR (24c washing machine adaptor).

As can be understood from FIG. 1 and the discussion, many possible outlet configurations are possible using the fittings provided with the control valve system 10. Table 1 below lists the various thread configurations found in the component parts of the disclosed embodiment of the control valve system 10.

TABLE 1

| Part Description | Interior Thread | Ext. Thread #1 | Ext. Thread #2 |
| --- | --- | --- | --- |
| Inlet Connector 18a | N/A | 13/16-16 UN-2A | N/A |
| Outlet Connector 18b | 11/16-16 UN-2B | N/A | N/A |
| Outlet Connector 18c | N/A | 9/16-24 UNEF-2A | N/A |
| Fitting 22a | N/A | 11/16-16 UN-2A | N/A |
| Fitting 22b | N/A | 11/16-16 UN-2A | 7/16-24 UNS-2A |
| Fitting 22c | N/A | 11/16-16 UN-2A | 9/16-24 UNEF-2A |
| Fitting 22d | N/A | 11/16-16 UN-2A | 3/4-11.5 NHR |
| Fitting 24a | 9/16-24 UNEF-2B | N/A | N/A |
| Fitting 24b | 9/16-24 UNEF-2B | 7/16-24 UNS-2A | N/A |
| Fitting 24c | 9/16-24 UNEF-2B | 3/4-11.5 NHR | N/A |
| Inlet Passage 16a | 5/8-16 UN-2B | N/A | N/A |
| Outlet Passage 16b | 5/8-16 UN-2B | N/A | N/A |
| Valve Seats 28a, 28b | N/A | 5/8-16 UN-2A | N/A |

A valve system in accordance with the present invention is ideally suited to the modern home environment. The valve system is able to supply fluid to multiple appliances from one multiple outlet valve. The compact configuration saves room in the cramped quarters under sinks and in bathroom vanities. The single shutoff valve allows the homeowner to shut off all supplied appliances with one movement of a single handle. Molded plastic construction reduces the cost of the assembly and assures the consumer of a lead-free supply of water.

While the preferred embodiments of the foregoing invention have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

What is claimed is:

1. A valve system comprising:

a valve housing, said housing defining a valve shaft chamber and at least two groups of fluid flow passages, each of said passages terminating at a connector on the exterior of said housing, the passages of each group being in fluid communication with said chamber, the first passage of each group being an inlet and the remaining passages being outlets, the inlet passage and at least a first outlet passage of each group being in axial alignment, at least a second outlet passage extending from each of said first outlet passages at a location downstream of said chamber;

a pair of spatially separated valve members, said valve members being movably positioned in said chamber, said valve members being located intermediate respective of said aligned inlet and outlet passages and in registration therewith, said valve members having a first position where flow between said aligned passages is permitted and a second position where flow between said aligned passages is prevented;

a rotatable valve shaft disposed in said chamber and coupled to said valve members;

a valve seat positioned in each of said inlet passages for cooperation with respective of said valve members;

a valve operator extending through said housing to engage said shaft whereby said valve members may be caused to simultaneously move between said first and second positions;

first seal means in said chamber and cooperating with said shaft and said housing to prevent fluid flow between said groups of passages; and a plurality of fittings for engaging said connectors, whereby the configuration of said connectors may be altered.

2. The valve system of claim 1, wherein said valve members comprise spherical ball-like structures.

3. The valve system of claim 1, wherein said system comprises a valve seat positioned in each of said first outlet passage for cooperation with respective of said valve members.

4. The valve system of claim 3, wherein said inlet and first outlet fluid flow passages have threaded interior surfaces and said valve seats are threadably engaged with respective of said inlet and first outlet passages, said valve seats being adjustable to sealingly engage opposing surfaces of respective of said valve members.

5. The valve system of claim 1, wherein said valve members and said valve shaft are an integral unit.

6. The valve system of claim 5, wherein said valve housing includes an opening for installation of said valve member and shaft unit.

7. The valve system of claim 1, wherein said valve housing, valve members, valve shaft, valve seats and fittings are molded plastic components.

8. The valve system of claim 1, wherein said valve housing, valve members, valve shaft, valve seats and fittings are plastic components molded of acetal.

9. The valve system of claim 1, wherein said operator comprises a head having a configuration to aid rotation, the configuration selected from the group consisting of square, hex and knurled.

10. The valve system of claim 1, wherein said shaft includes at least one transverse groove and said first seal means comprises an o-ring seatable in each of said grooves.

11. The valve system of claim 3, wherein each said valve seat comprises a tool insertion point.

12. The valve system of claim 6, wherein said valve housing includes a cap sealingly engageable with said opening.

13. The valve system of claim 1, wherein each group of fluid flow passages terminates in at least one inlet connector having an external 13/16-16 UN-2A thread, at least a first outlet connector having an internal 11/16-16 UN-2B thread and a second outlet connector having an external 9/16-24 UNEF-2A thread.

14. The valve system of claim 13, wherein said fittings include at least one plug complementary to said first outlet connector and at least one cap complementary to said second outlet connector.

15. The valve system of claim 13, wherein said fittings include a first subset of said fittings each comprising a first portion having a thread configuration complementary to said first outlet connector and a second portion having a thread configuration selected from the group consisting of 7/16-24 UNS-2A, 9/16-24 UNEF-2A and 3/4-11.5 NHR.

16. The valve system of claim 13, wherein said fittings include a second subset of said fittings each comprising a first portion having a thread configuration complementary to said second outlet connector and a second portion having a thread configuration selected from the group consisting of 7/16-24 UNS-2A and 3/4-11.5 NHR.

* * * * *